United States Patent [19]

Körtgen et al.

[11] Patent Number: 4,944,498

[45] Date of Patent: Jul. 31, 1990

[54] GAS SPRING

[75] Inventors: Bernd Körtgen, Adenau; Helmut Morgen, Mannebach; Heinz-Josef Heinrichs, Koblenz-Metternich; Castor Fuhrmann, Brachtendorf; Herbert Freitag, Koblenz-Metternich, all of Fed. Rep. of Germany

[73] Assignee: Stabilus GmbH, Koblenz-Neuendorf, Fed. Rep. of Germany

[21] Appl. No.: 218,671

[22] Filed: Jul. 13, 1988

[30] Foreign Application Priority Data

Jul. 17, 1987 [DE] Fed. Rep. of Germany ....... 3723654

[51] Int. Cl.$^5$ .............................................. F16F 9/36
[52] U.S. Cl. ..................................... 267/64.11; 92/83; 92/165 R; 92/168; 188/322.17; 267/118; 277/208; 277/211; 277/177
[58] Field of Search ................. 267/64.11, 64.28, 118; 188/322.17; 277/173, 177, 208, 209, 210, 215; 92/83, 165 R, 168

[56] References Cited

U.S. PATENT DOCUMENTS

| 3,804,217 | 4/1974 | Keijzer et al. | 188/322.17 |
|---|---|---|---|
| 3,850,483 | 11/1974 | Roberts et al. | 92/168 X |
| 3,856,287 | 12/1974 | Freitag | 188/322.17 X |
| 4,030,716 | 6/1977 | Freitag. | |
| 4,044,866 | 8/1977 | Ishida | 188/322.17 X |
| 4,060,023 | 11/1977 | Vegella | 92/168 |
| 4,342,447 | 8/1982 | Marx. | |
| 4,360,192 | 11/1982 | Ishida | 188/322.17 X |
| 4,548,389 | 10/1985 | Smith et al. | 267/64.11 |
| 4,553,761 | 11/1985 | Blesing et al. | 277/152 |
| 4,588,195 | 5/1986 | Antonini et al. | 277/153 |
| 4,660,839 | 4/1987 | Mitumaru | 277/153 |
| 4,693,343 | 9/1987 | Boyd | 188/322.17 |

FOREIGN PATENT DOCUMENTS

| 1144544 | 2/1963 | Fed. Rep. of Germany | 188/322.17 |
|---|---|---|---|
| 3042076 | 5/1981 | Fed. Rep. of Germany. | |
| 3600971 | 7/1987 | Fed. Rep. of Germany | 188/322.17 |
| 2234811 | 1/1975 | France. | |

Primary Examiner—George E. A. Halvosa
Attorney, Agent, or Firm—Brumbaugh, Graves, Donohue & Raymond

[57] ABSTRACT

In a gas spring the piston rod is guided through one end of a container. Adjacent to this one end two sealings are provided in axial direction one behind the other, namely an axially outer sealing and an axially inner sealing. A liquid chamber is defined between the axially outer sealing and the axially inner sealing. The axially inner sealing comprises a sealing ring of elastomeric material. This sealing ring comprises a radially outer root portion and a radially inner lip portion. The root portion engages an internal circumferential surface of the container tube. The lip portion engages an external circumferential surface of the piston rod. The axial dimension of the root portion is substantially larger than the axial dimension of the lip portion. The sealing ring may be deflected by pressure differences on both sides of the sealing ring such that a fluid exchange is possible between both axial sides of the sealing ring when the pressure difference exceeds a predetermined value.

30 Claims, 1 Drawing Sheet

GAS SPRING

BACKGROUND OF THE INVENTION AND STATEMENT OF THE PRIOR ART

In known gas springs a piston rod passes through one end of a container tube. Adjacent to this one end a sealing system is provided. This sealing system comprises a first axially outer sealing unit and a second axially inner sealing unit. A liquid chamber is defined between the axially outer and the axially inner sealing unit. Due to liquid migration across the axially inner sealing unit pressure differences may occur across the axially inner sealing unit, particularly when the piston rod is provided with a piston unit, and rapid movements of the piston rod with respect to the container tube are to be expected. Such pressure differences can result in destruction of the axially inner piston unit.

For avoiding such destruction German 'Offenlegungsschrift' 35 03 537 shows an axially inner sealing unit which is subject to the action of a mechanical spring. This mechanical spring increases the pressure within the liquid chamber.

OBJECT OF THE INVENTION

It is an object of the present invention to provide a gas spring with an improved axially inner sealing unit, which avoids high pressure differences between the liquid chamber and an adjacent working space such that the risk of a destruction of the axially inner sealing unit is also avoided. A further object of the present invention is to provide a gas spring which can be easily assembled and avoids escaping of the pressurized gas.

SUMMARY OF THE INVENTION

A gas spring comprises a container tube which has an axis and two ends and defines a cavity. Piston rod guide means are provided at at least one end of the container tube. A piston rod is guided in axial direction of the container tube through said piston rod guide means. Sealing means are provided adjacent to said at least one end. These sealing means comprise a first axially outer sealing unit and a second axially inner sealing unit. The axially inner sealing unit comprises a sealing ring of elastomeric material. The sealing ring is in sealing engagement with an internal circumferential surface of the container tube and in sealing engagement with an external circumferential surface of said piston rod. A liquid chamber is defined between the first sealing unit and the second sealing unit. This liquid chamber contains a liquid. A working space is defined between the second sealing unit and the other one of the two ends of the container tube. This working space contains a volume of pressurized gas. The sealing ring comprises—when regarded in a sectional plane containing said axis of said container tube—a radially outer root portion and a radially inner lip portion. The root portion engages the internal circumferential surface of the container tube. The lip portion engages the external circumferential surface of the piston rod. The axial dimension of the root portion is substantially larger than the axial dimension of said lip portion.

Due to the axially reduced dimension of the lip portion the lip portion is deflectable in axial direction if pressure differences occur between the liquid chamber and the working space. If very high pressure differences occur, the lip portion can be deflected to such an extent that a fluid exchange is possible between the liquid chamber and the working space.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereinafter with reference to embodiments shown in the accompanying drawings, in which.

DESCRIPTION OF THE PREFERRED EMBODIMENTS

Figure 1:
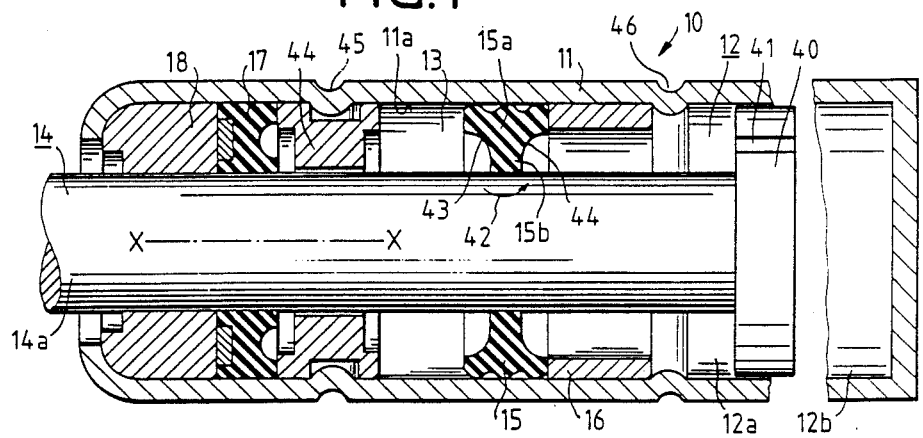
FIG. 1 is a longitudinal section of a gas spring of this invention.

The gas spring of FIG. 1 is designated by 10 and comprises a container tube 11. The cavity within the container tube 11 is subdivided into a working space 12 filled with pressurized gas, and a liquid chamber 13 containing a liquid. A piston rod 14 is guided by piston rod guide means 18 through one end of the container tube 11. A first sealing unit 17 is associated to the piston rod guide means 18.

The working space 12 and the liquid chamber 13 are separated from each other by a sealing ring 15. The sealing ring 15 is supported towards the working space 12 by a spacer sleeve 16, but is otherwise free at both of its axially spaced end faces of rigid reinforcement members connected thereto for common axial movement. This spacer sleeve 16 is axially supported by a bulge 46. The sealing ring 15 is made of homogeneous elastomeric material and is provided on its radially outer circumferential face 19 with sealing bulges 20. In the shown embodiment three bulges are provided which are in sealing engagement with the inner circumferential surface 11a of the container tube 11.

Figure 2:
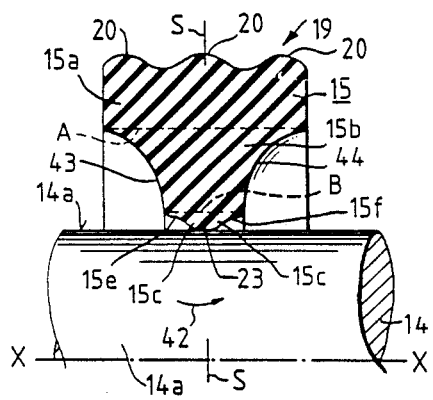
FIGS. 2 to 4 show different embodiments of the sealing ring of the axially inner sealing unit.

As shown in FIG. 2 the sealing ring 15 is shaped with a sealing lip portion 15b having a sealing edge portion 15c with a sealing edge 23 which engages the surface 14a of the piston rod 14. This sealing edge portion 15c is shaped as a bulge having a predetermined radius and is symmetrical with respect to a plane of symmetry S—S.

Figure 3:
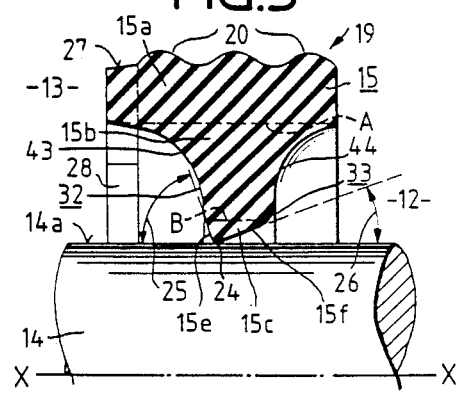

In the embodiment of FIG. 3 the lip portion 15b has a sealing edge portion 15c with a sealing edge 24 and defines an acute angle 25 towards the liquid chamber 13 and an acute angle 26 towards the working space 12. The angle 25 is three times to five times as large as the acute angle 26. The sealing edge 24 is nearer to the outer face 32 of the sealing lip 15b, i. e. nearer to the liquid chamber 13. The distance between the sealing edge 24 and the inner side 33 of the lip portion 15b is about four to six times the distance between the sealing edge 24 and the outer side 32. In order to be able to automatically assemble such a gas spring with a non-symmetrical lip portion 15b, it is necessary to provide the sealing ring with a circular projection 27 or a plurality of projections 28.

Figure 4:
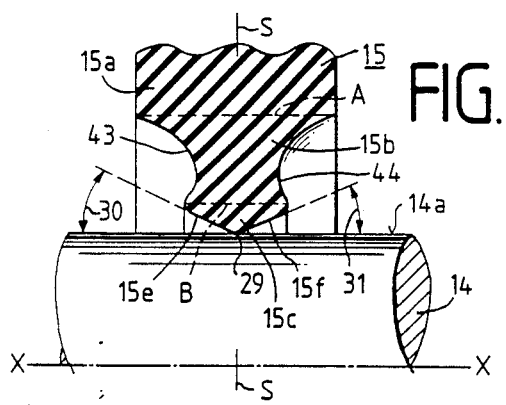

In the embodiment of FIG. 4 the lip portion 22 is provided with a symmetrical sealing edge 29. The sealing edge 29 has an outer acute angle 30 and an identical inner acute angle 31.

According to FIGS. 2, 3 and 4 the sealing ring 15 is by a virtual line A divided into a root portion 15a and a lip portion 15b. The root portion 15a is radially outwards and engages by its sealing bulges 20 the internal circumferential surface 11a of the container tube 11. At the radial inner end of the lip portion 15b one sees a triangularly shaped sealing edge portion 15c which is defined against the lip portion 15b by a virtual line B. The sealing edge portion 15c engages the circumferential surface of the piston rod 14 by a sealing edge 23. Triangle side lines 15e and 15f converge towards the sealing edge 23. These triangle side lines 15e and 15f are of identical lengths and define small acute angles of identical sizes with the axis X—X.

In the embodiment of FIG. 3 the sealing edge portion 15c has an acute sealing edge 24. The triangle side lines 15e and 15f are of different lengths. The triangle side line 15e is shorter and defines with the axis X—X a large acute angle 25. The triangle side line 15f is longer and defines with the axis X—X a small acute angle 26. The angle 25 is about four times the angle 26.

In the embodiment of FIG. 4 the triangular sealing edge portion 15c has an acute sealing edge 29. The triangle side lines 15e and 15f are substantially equal and define small acute angles 30 and 31 of equal sizes with the axis X—X.

In the liquid space 13 a liquid is contained as already stated, which liquid substantially fills the liquid space 13. This liquid has a sealing function, because it is more easy to seal a liquid under pressure than a gas under pressure. So the liquid 13 in a certain sense helps to sealingly enclose the pressurized gas in the working space 12.

Also in the working space 12 there is provided besides the pressurized gas a quantity of liquid which may be a small quantity. This liquid is e. g. an oil.

In operation a frequent oscillation movement of the piston rod 14 occurs with respect to the container tube 11. By this axial movement liquid can be transported between the liquid chamber 13 and the working space 12. The liquid transport can occur in different directions in dependency upon the form of the sealing ring 15 and in dependency upon the position of the gas spring in space. So it is possible that a liquid transport in the form of a film adherent to the piston rod 14 occurs from the gas space 12 towards the liquid chamber 13. By this liquid transport the liquid chamber 13 may be overfilled. Moreover, the piston rod 14 is provided with a piston unit 40 which divides the working space 12 into two partial working spaces 12a and 12b. The piston 40 is bridged by a throttled flow passage 41. When the piston 40 is moved to the right as a result of a rapid inward movement of the piston rod 14, the partial space 12a is increased. Due to the throttling action of the throttled flow passage 41 a reduced pressure in the partial working space 12a occurs. When, on the other hand, the liquid chamber 13 is already overfilled and contains liquid under pressure, the sealing ring 15 is loaded to the right as a result of the reduced pressure in the partial space 12a. This load to the right could become as large as to damage or destroy the sealing ring 15 and to make the gas spring 15 unfit for use. Due to the form of the sealing ring 15 with the lip portion 15b a pressure balancing can occur within the liquid chamber 13. The lip portion 15b can be deflected with respect to the root portion 15a in the direction of the arrow 42 of FIGS. 1 and 2. This deflection of the lip portion 15b provides a balancing effect. This balancing effect can be still increased in that liquid escapes towards the working space 12. When, on the other hand, liquid is transported by the piston rod 14 from the liquid chamber 13 to the working space 12 e. g. because the gas spring has a substantially vertical axis and the piston rod 14 is directed upwards, the sealing ring 15 in FIG. 1 can move to the left, because it is freely floating. Moreover, the lip portion 15b can be deflected again with respect to the root portion 15 in a direction opposite to the direction of the arrow 42. Such the risk of a destruction of the sealing ring 14 is eliminated even if a slow escape of liquid from the liquid chamber occurs, which is undesirable but cannot be always completely avoided.

In FIG. 2 the triangular sealing edge portion 15c is essentially symmetrical with respect to the plane of symmetry S—S. With such a construction liquid drift is substantially equal in both directions over a longer period of operation, so that the liquid contact of the liquid chamber 13 does not substantially change. The sealing edge 23 is bulge-shaped. This bulge-shaped form of the sealing edge is particularly desirable in view of a long lifetime of the sealing ring 15.

In the embodiment of FIG. 3 the triangle shaped sealing portion 15c is non-symmetric. The long triangle side line 15f defining the small acute angle 26 is directed towards the inner side 33 of the lip portion 15b, i. e. towards the working space 12. The short triangle side line 15e with the large acute angle 25 is adjacent to the outer side of the sealing ring 15, i. e. adjacent to the liquid chamber 13. It has been found that with this embodiment a preferred liquid transport occurs from the working space 12 towards the liquid chamber 13 when oscillating movement of the piston rod occurs. Therefore, this embodiment will be selected especially if the gas spring is in operation maintained in a substantially vertical position such that the piston rod 14 is directed vertically upwards. In such situation there is a tendency of liquid escape from the liquid chamber 13 towards the working space 12. This tendency is compensated for by the fact that liquid is preferably transported from the working space 12 towards the liquid chamber 13 as a result of the non-symmetric triangle shaped formation of the sealing edge portion 15c.

In FIGS. 1, 2 and 3 the lip portion 15b is defined by concavely and steadily curved flanks 43, 44. These flanks 43, 44 have at respective radially outer ends thereof tangent lines which define a small acute angle with the axis X—X. On the other hand, the flanks 43 have at their respective radially inner ends tangent lines which are substantially perpendicular with respect to the axis X—X.

One further sees from the embodiment of FIGS. 2 and 3 that the radial dimension of the root portion 15a is about 30 per cent of the radial distance between the external surface 14a of the piston rod and the internal surface 11a of the container tube. Generally, the radial dimension of the root portion 15a should be less than about 50 per cent of the radial distance between surfaces 14a and 11a and preferably about 30 to 40 percent of such distance.

Further, one sees that in the embodiment of FIGS. 2 and 3, the axial length of the lip portion 15b—as measured at the radial location of the virtual line B—is about 40 per cent of the axial length of the root portion 15a. Generally, such axial length of the lip portion 15b should be less than 50 percent and preferably about 35 to 40 percent of the axial length of the root portion 15a. It is to be noted that the virtual line B has a distance from the external surface 14a of the piston rod 14 which is about 10 to 20 per cent of the radial distance between the external surface 14a and the internal surface 11a.

In the embodiment of FIG. 4, the flanks 43 and 44 have a modified form as compared with the embodiments of FIGS. 2 and 3. The axial dimension of the lip portion 15b first of all decreases from the line A towards the line B and increases again when further approaching the line B. The sealing edge 29 is in FIG. 4 symmetrical with respect to the plane of symmetry S—S and is acute. This embodiment avoids liquid transport in both directions to a high extent as a result of the acute design of the sealing edge 29. With respect to FIG. 1 it is still to be stated that the sealing unit 17 is secured by a securing ring 44 in axial direction. This securing ring 44 is fixed in axial direction by a bulge 45.

The sealing ring 15 is fixed by the spacer sleeve 16 towards the right. This spacer sleeve 16 is axially supported by a radially inwardly directed bulge 46 of the container tube 11.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

What is claimed is:

1. A gas spring comprising a container tube (11) which has an axis and two ends and defines a cavity, piston rod guide means (18) at at least one end of the container tube (11), a piston rod (18) guided in axial direction (X—X) of the container tube (11) through said piston rod guide means (18), and sealing means (15,17) adjacent to said at least one end, said sealing means comprising a first axially outer sealing unit (17) and a second axially inner sealing unit (15), said second sealing unit (15) comprising a sealing ring (15) of homogeneous elastomeric material, said sealing ring (15) being in sealing engagement with an internal circumferential surface (11a) of said container tube (11) and in sealing engagement with an external circumferential surface (14a) of said piston rod (14), a liquid chamber (13) being defined between said first sealing unit (17) and said second sealing unit (15), said liquid chamber (13) containing a liquid, a working space (12) being defined between said second sealing unit (15) and the other one of said two ends of said container tube (11), said working space (12) containing a volume of pressurized gas, said sealing ring (15) comprising—when regarded in a sectional plane containing said axis (X—X) of said container tube (11)—a radially outer root portion (15a) and a radially inner lip portion (15b), said root portion (15a) engaging said internal circumferential surface (11a) of said container tube (11) in at least two axially spaced radially outer annular contact areas separated from each other by at least one radially outer annular non-contact area, with the radial dimension of said root portion (15a) being less than about 50 percent of the radial distance between said external surface (14a) of said piston rod and said internal surface (11a) of said container tube, said lip portion (15b) engaging said external circumferential surface (14a) of said piston rod (14) in one single radially inner annular contact area, with the axial dimension of said lip portion (15b), as measured at a radial location spaced from the external surface (14a) by a distance of approximately 10-20% of the radial distance between the external surface (14a) and the internal surface (11a), being less than about 50 percent of the axial length of said root portion (15a), said sealing ring (15) being axially movable with respect to said internal circumferential surface (11a) of said container tube (11), said one single radially inner contact area being located axially between said at least two radially outer contact areas, and said sealing ring (15) being free at both of its axially spaced end faces of rigid reinforcement members connected thereto for common axial movement.

2. A gas spring as set forth in claim 1 wherein:

said radial dimension of said root portion (15a) is approximately 30 to 40 percent of the radial distance between said external surface (14a) of said piston rod and said internal surface (11a) of said container tube, and said axial dimension of said lip portion 15b) is approximately 35-40 percent of the axial length of said root portion (15a).

3. A gas spring as set forth in claim 1, wherein:

said radial dimension of said root portion (15a) is approximately 35 percent of the radial distance between said external surface (14a) of said piston rod and said internal surface (11a) of said container tube, and said axial dimension of said lip portion (15b) is approximately 40 percent of the axial length of said root portion (15a).

4. A gas spring comprising a container tube (11) which has an axis and two ends and defines a cavity, piston rod guide means (18) at at least one end of the container tube (11), a piston rod (18) guided in axial direction (X—X) of the container tube (11) through said piston rod guide means (18) and sealing means (15, 17) adjacent to said at least one end, said sealing means comprising a first axially outer sealing unit (17) and a second axially inner sealing unit (15), said second sealing unit (15) comprising a sealing ring (15) of homogeneous elastomeric material, said sealing ring (15) being in sealing engagement with an internal circumferential surface (11a) of said container tube (11) and in sealing engagement with an external circumferential surface (14a) of said piston rod (14), a liquid chamber (13) being defined between said first sealing unit (17) and said second sealing unit (15), said liquid chamber (13) containing a liquid, a working space (12) being defined between said second sealing unit (15) and the other one of said two ends of said container tube (11), said working space (12) containing a volume of pressurized gas, said sealing ring (15) comprising—when regarded in a sectional plane containing said axis (X—X) of said container tube (11)—a radially outer root portion (15a) and a radially inner lip portion (15b), said root portion (15a) engaging said internal circumferential surface (11a) of said container tube (11) in at least two axially spaced radially outer annular contact areas separated from each other by at least one radially outer annular non-contact area, with the radial dimension of said root portion (15a) being less than about 50 percent of the radial distance between said external surface (14a) of said piston rod and said internal surface (11a) of said container tube, said lip portion (15b) engaging said external circumferential surface (14a) of said piston rod (14) in one single radially inner annular contact area, with the axial dimension of said lip portion (15b), as measured at a radial location spaced from the external surface (14a) by a distance of approximately 10–20% of the radial distance between the external surface (14a) and the internal surface (11a), being less than about 50 percent of the axial length of said root portion (15a), and said sealing ring (15) being axially movable with respect to said internal circumferential surface (11a) of said container tube (11), said sealing ring (15) being free at both of its axially spaced end faces of rigid reinforcement members connected thereto for common axial movements.

5. A gas spring as set forth in claim 4, said root portion (15a) being provided with sealing bulges (20) engaging said internal circumferential surface (11a) of said container tube (11).

6. A gas spring as set forth in claim 5, said root portion (15a) having respective sealing bulges (20) adjacent to both axial ends thereof.

7. A gas spring as set forth in claim 6, at least one further sealing bulge (20) being provided between said sealing bulges (20) provided adjacent to respective axial ends of said root portion (15a).

8. A gas spring as set forth in claim 5, said sealing bulges (20) defining—when regarded in a sectional plane containing said axis (X—X)—a wave-shaped profile.

9. A gas spring as set forth in claim 4, said lip portion (15b) being located in a middle area of the axial extent of said root portion (15a).

10. A gas spring as set forth in claim 4, said lip portion (15b) being defined—when regarded in a sectional plane containing said axis (X—X)—by two flanks (43, 44), said flanks being concave and substantially steadily curved.

11. A gas spring as set forth in claim 10, each of said flanks (43, 44) having a tangent line adjacent to its radially outer end, which defines a small acute angle with said axis (X—X) of the container tube (11), and each of said flanks (43, 44) having a tangent line adjacent to the respective inner end thereof, which is substantially perpendicular with respect to said axis (X—X).

12. A gas spring as set forth in claim 4, said sealing ring (15) being approximately symmetrical with respect to a plane (S—S) of symmetry which is perpendicular to said axis (X—X) of said container tube (11).

13. A gas spring as set forth in claim 4, said sealing ring (15) having identifying marks (27, 28) which permit identification of respective axial ends of said sealing ring (15).

14. A gas spring as set forth in claim 4, said lip portion (15b) being provided adjacent to its radially inner end with a substantially triangular sealing edge portion (15c), said sealing edge portion (15c) having a sealing edge (23, 24, 29) in engagement with said external circumferential surface (14a) of said piston rod (14).

15. A gas spring as set forth in claim 14, said sealing edge portion (15c) having a bulge-shaped rounded sealing edge (23) in engagement with said external circumferential surface (14a) of said piston rod (14).

16. A gas spring as set forth in claim 14, said sealing edge portion (15c) having an acute sealing edge (24) in engagement with said external circumferential surface (14a) of said piston rod (14).

17. A gas spring as set forth in claim 14, said triangular sealing edge portion (15c) being defined by two triangle side lines (15e, 15f) converging towards said sealing edge (29), said triangle side lines (15e, 15f) being substantially of identical lengths and defining substantially equal angles (30, 31) with said axis (X—X) of said container tube (11).

18. A gas spring as set forth in claim 14, said triangular sealing edge portion (15c) being defined by two triangle side lines (15e, 15f) having different lengths and converging towards said sealing edge (24), the longer one (15f) of said triangle side lines defining a smaller acute angle (26) with said axis (X—X) of said container tube (11), and the shorter one (15e) of said triangle side lines defining a larger acute angle (25) with said axis (X—X) of said container tube (11).

19. A gas spring as set forth in claim 18, said larger acute angle (25) being about three times to five times the smaller acute angle (26).

20. A gas spring as set forth in claim 18, said longer triangle side line (15f) being adjacent to said working space (12) and said shorter triangle side line (15e) being adjacent to said liquid chamber (13).

21. A gas spring as set forth in claim 4, said working space (12) also containing some liquid.

22. A gas spring as set forth in claim 4, said sealing ring (15) being fixable against movement towards said other end of said gas spring (10) by abutment means (46, 16).

23. A gas spring as set forth in claim 22, said abutment means (16, 46) comprising a radially inwardly shaped bulge (46) of said container tube (11) and a spacer sleeve (16) abutting said bulge (46).

24. A gas spring as set forth in claim 4, said sealing ring (15) being freely movable towards said first sealing unit (17).

25. A gas spring as set forth in claim 24, said first sealing unit (17) comprising a securing ring (44) on the side thereof facing said other end of said container tube, said securing ring (44) being fixed to said container tube (11), and said sealing ring (15) being freely movable towards said securing ring (44).

26. A gas spring as set forth in claim 4, said root portion (15a) having end faces which are substantially perpendicular to said axis (X—X) of said container tube.

27. A gas spring as set forth in claim 4, said piston rod (14) carrying a piston unit (40) within said working space (12), said piston unit (40) dividing said working space (12) into two partial spaces (12a, 12b), said partial spaces (12a, 12b) being interconnected by a throttled flow path (41).

28. The gas spring of claim 4 wherein the radial dimension of said root portion (15a) is approximately 40 percent of the radial distance between said external circumferential surface (14a) of said piston rod (14) and said internal circumferential surface (11a) of said container tube (11).

29. A gas spring as set forth in claim 4, wherein:
said radial dimension of said root portion (15a) is approximately 30–40 percent of the radial distance between said external surface (14a) of said piston rod and said internal surface (11a) of said container tube, and said axial dimension of said lip portion (15b) is approximately 35–40 percent of the axial length of said root portion (15a).

30. A gas spring as set forth in claim 4, wherein:
said radial dimension of said root portion (15a) is approximately 35 percent of the radial distance between said external surface (14a) of said piston rod and said internal surface (11a) of said container tube, and said axial dimension of said lip portion (15b) is approximately 40 percent of the axial length of said root portion (15a).

* * * * *